United States Patent [19]

Inoue

[11] 4,366,360
[45] Dec. 28, 1982

[54] METHOD OF AND APPARATUS FOR DETERMINING RELATIVE POSITION OF A TOOL MEMBER TO A WORKPIECE IN A MACHINE TOOL

[75] Inventor: Kiyoshi Inoue, Tokyo, Japan

[73] Assignee: Inoue-Japax Research Incorporated, Yokohama, Japan

[21] Appl. No.: 254,094

[22] Filed: Apr. 14, 1981

Related U.S. Application Data

[60] Continuation-in-part of Ser. No. 112,460, Jan. 16, 1980, which is a division of Ser. No. 860,164, Dec. 13, 1977, Pat. No. 4,236,057.

[30] Foreign Application Priority Data

Apr. 21, 1980 [JP] Japan ................................. 55/52733

[51] Int. Cl.³ ................................................ B23P 1/08
[52] U.S. Cl. ............................. 219/69 M; 219/69 W
[58] Field of Search ................ 219/69 R, 69 C, 69 G, 219/69 D, 69 V, 68, 69 P; 266/76

[56] References Cited

U.S. PATENT DOCUMENTS 3,973,104 8/1976 Ullmann et al. ................... 219/69 G
4,236,057 11/1980 Inoue ................................. 219/69 P Primary Examiner—M. H. Paschall
Attorney, Agent, or Firm—Karl F. Ross

[57] ABSTRACT

A technique for accurately determining the size of a machining gap and a specific resistivity thereof in a machine tool, especially an electroerosion machine tool (e.g. EDM machine), measures the electrical resistance between a tool member and a workpiece in a given relative position to give a first measurement value. The tool member and the workpiece are then relatively displaced by a known distance from the given relative position to establish a shifted relative position and the electrical resistance therebetween is measured to give a second measurement value. The calculation from the first and second measurement values yields one of the given and shifted relative position and the specific resistivity of the gap.

22 Claims, 10 Drawing Figures

METHOD OF AND APPARATUS FOR DETERMINING RELATIVE POSITION OF A TOOL MEMBER TO A WORKPIECE IN A MACHINE TOOL

CROSS-REFERENCE TO RELATED APPLICATION

This application is a continuation-in-part of Ser. No. 112,460 filed Jan. 16, 1980 which is a division of application Ser. No. 860,164 filed Dec. 13, 1977, now U.S. Pat. No. 4,236,057.

FIELD OF THE INVENTION

The present invention relates to a positioning method and apparatus in a machine tool in general. More particularly, it relates to a novel method of and apparatus for ascertaining or correcting relative positions of a machining tool or tool member to a workpiece in a machine tool and, especially but not exclusively in an electroerosion machine tool, e.g. EDM (electrical discharge machining) and ECM (electrochemical machining) equipments.

BACKGROUND OF THE INVENTION

In a machine tool it is desirable to ascertain and correct the relative position between a tool member and a workpiece at a given instant in the course of a machining operation to allow machining to proceed with safety and in a manner to yield desired results and machining accuracy.

For example, in an electroerosion machine tool, a tool electrode is juxtaposed with a workpiece across a machining gap flushed with a liquid machining medium and a continuous or pulsed electric current of high current density is passed through the gap between the tool electrode and the workpiece to electroerosively remove material from the workpiece. As material removal proceeds, the tool electrode and the workpiece are relatively displaced in a direction to advance the erosion process and in a manner to maintain the machining gap substantially constant in its size and desirably also the physical condition therein. It can been seen, therefore, that the precision of ascertainment and correction of the machining gap is critical to the machining results that ensue.

In the prior art, substantial efforts have accordingly been focused on seeking to provide a method of greater reliability to ascertain the gap size and condition especially in EDM processes. In one advanced method, which is disclosed in my U.S. Patent Application Ser. No. 112,460 filed Jan. 16, 1980 as a continuation of Ser. No. 860,164 filed Dec. 13, 1977 (now U.S. Pat. No. 4,236,057 issued Nov. 25, 1980), the supply of machining power pulses to the EDM gap is temporarily interrupted and, during the pwriod of interruption, a monitoring pulse is applied across the gap to measure a gap variable, e.g. impedance or resistance, from which the gap size and condition may be ascertained.

I have now determined, however, that the measurement alone of a variable of the gap condition as it actually exists at any instant during the monitoring pulse at which a command for the measurement is applied does not necessarily yield the precise indication of the gap size and condition.

OBJECTS OF THE INVENTION

It is, accordingly, an important object of the present invention to provide a novel method whereby an actual relative position of a tool member to a workpiece is accurately ascertained and corrected to a predetermined position in a machine tool.

Another object of the present invention is to provide an improved method for monitoring the machining gap in an electroerosion machine tool whereby not only the actual size of the machining gap but also the specific resistance thereof can be ascertained with precision and reliability.

A further object of the invention is to provide a novel and improved method which extends the principles set forth in the aforementioned copending patent application.

An additional object of the invention is to provide an accurate and reliable apparatus for ascertaining and/or correcting the relative position between a tool and a workpiece in a machine tool, especially an electroerosion machine tool, which apparatus is relatively simple and inexpensive and can be constructed relatively easily.

SUMMARY OF THE INVENTION

In accordance with the present invention, in a first aspect thereof, there is provided a method of ascertaining or determining the relative position of a tool member to a workpiece in a machine tool, especially but not exclusively an electroerosive machine tool, which method comprises: (a) measuring the electrical resistance between the tool member and the workpiece in a given relative position to give a first measurement value; (b) relatively displacing the tool member and the workpiece by a known distance whereby to establish a shifted relative position between the tool member and the workpiece; (c) measuring the electrical resistance between the tool member and the workpiece in the said shifted relative position to give a second measurement value; and (d) calculating at least one of the said given and shifted relative positions from the said first and second measurement values and the said known distance.

The foregoing steps of the method are carried out preferably upon interrupting a given machining operation or subsequent to the time of this interruption at which time the tool member and the workpiece have been brought to the said given relative position. Thus, with an electroerosion machine tool, the supply of a machining current may temporarily be halted to set up a monitoring period when the tool member and workpiece have reached the given relative position. During the monitoring period, the step (a) is carried out with the tool member and the workpiece in this given relative position. A plurality of monitoring pulses are applied between the tool member and the workpiece during the monitoring period and the step (a) to measure the electrical resistance therebetween in the said given relative position is carried out with one or more monitoring pulses prior to the step (b) that displaces the tool member and the workpiece by the known distance to bring them into the shifted relative position. The step (c) is are carried out with one or more subsequent monitoring pulses to measure the electrical resistance between the tool member and the workpiece in the shifted relative position. In the step (d), the first and second measurement values gained in the steps (a) and (c) are used together with the aforesaid known distance to yield one and/or another of the said given and shifted relative positions between the tool member and the workpiece.

In this manner, the precise relative position or the precise size of the gap between the tool member and the workpiece is ascertained during or after a given course of machining operation and may be used to bring the tool member and the workpiece into a predetermined correct position or spaced apart with a predetermined correct gap size for further machining of the workpiece or to judge the accuracy of the machining which has been conducted.

In accordance with specific optional features of the invention, therefore, the method further includes the step of correcting the relative position of the tool member to the workpiece by calculating a deviation in distance of the said one of the given and shifted relative positions from a predetermined correct relative position or gap size and relatively displacing the tool member and the workpiece from the said one of the given and shifted relative positions by the said deviation in distance or so as to make the said deviation nil. The method may alternatively or additionally include the step of judging the accuracy of the machining that has been conducted by calculating a deviation in distance of the said one of the given and shifted relative positions from a predetermined correct relative position or gap size between the tool member and the workpiece.

According to a further optional feature of the invention, the method may further include the step of determining the specific resistivity of the gap between the tool member and the workpiece by calculating it from the said first and second measurement values and the said known distance.

Once the specific resistivity in the gap with a given gap medium, either liquid or gas or both, or in general a fixed value proportional thereto is obtained, it is possible automatically to obtain the aforementioned deviation or to bring the tool member and the workpiece into the aforementioned predetermined correct relative position. Thus, the particular electrical resistance value corresponding to the predetermined correct relative position or gap size between the tool member and the workpiece is obtained from the specific resistivity or the fixed value proportional thereto. Then the tool member and the workpiece are relatively displaced until the electrical resistance therebetween becomes the aforesaid particular value. Thereby the predetermined correct relative position or gap size between the tool member and the workpiece is reached and the aforesaid deviation is obtained from this distance displacement effected between the tool member and workpiece.

The invention is especially advantageous for use with a numerically controlled machine tool, e.g. an NC (numerically controlled) milling or other machinie tool, an NC two-or three-dimensional EDM machine tool or an NC wire-cut EDM machine tool. The relative position between the tool member and the workpiece at which the electrical resistance becomes a particular value may be memorized in an NC controller. From the distance between this position and the aforementioned given position, the deviation of the latter from a due or destined position is calculated and used to achieve the positioning correction. The distance of a displacement is given by the number of driven pulses applied. Thus, the given position can be determined from the number of drive pulses used for displacement until a predetermined value of the electrical resistance is attained.

In accordance with a further optional feature of the invention, the step (b) may be carried out by imparting to the tool member a small vibration with an amplitude corresponding to or coinciding with the aforementioned known distance and the step (c) may be carried out by measuring the electrical resistance between the vibrating tool member and the workpiece.

The invention also provides, in a second aspect thereof, an apparatus for ascertaining or determining the relative position of a tool member to a workpiece in a machine tool, especially but not exclusively an electroerosion machine tool, which apparatus comprises in combination: means for interrupting a given machining operation with the machine tool, drive means for relatively displacing the tool member and the workpiece to hold them in a given relative position and subsequently to place them in a relative position shifted by a known distance from the given relative position during a period of the interruption of the machining operation, sensing means for measuring the electrical resistances between the tool member and the workpiece in the given relative position and subsequently in the said shifted relative position to give first and second measurement values and computing means for calculating at least one of the given and shifted relative positions from the first and second measurement values and the known distance.

The apparatus is advantageously adapted to correct the determined relative position between the tool member and the workpiece. To this end, the computing means is adapted to calculate a deviation in distance of the aforementioned one of the given and shifted relative positions from a predetermined correct relative position or gap size between the tool member and the workpiece and the drive means is adapted to operate in response to the computing means for relatively displacing the tool member and the workpiece by the calculated deviation in distance calculated.

The apparatus also advantageously includes display means associated with the computing means for displaying one of the given and shifted relative positions or a deviation thereof from a predetermined correct relative position or gap size between the tool member and the workpiece.

The computing means may further be adapted to calculate the specific resistivity of the gap between the tool member and the workpiece from the aforementioned first and second measurement values and the known distance. The display means may be adapted to display the specific resistivity determined.

In accordance with a further optional feature of the invention, the drive means may include a sonic or ultrasonic vibrator for imparting to the tool member vibrations of a sonic or ultrasonic frequency to periodically bring the tool member and the workpiece into the aforesaid shifted relative position, thereby permitting the said sensing means to measure the electrical resistance between the vibrating tool member and the workpiece to give the said second measurement value representing the electrical resistance at the aforesaid shifted relative position.

BRIEF DESCRIPTION OF THE DRAWING

These and other objects, features and advantages of the invention will become more readily apparent from the following description as taken with reference to the accompanying drawing in which.

SPECIFIC DESCRIPTION

In the description which follows, reference is primarily made to an EDM process, arrangement or machine tool. It should be understood that the principles of the invention are equally applicable to any other type of the machining process, arrangement or machine tool.

Figure 1:
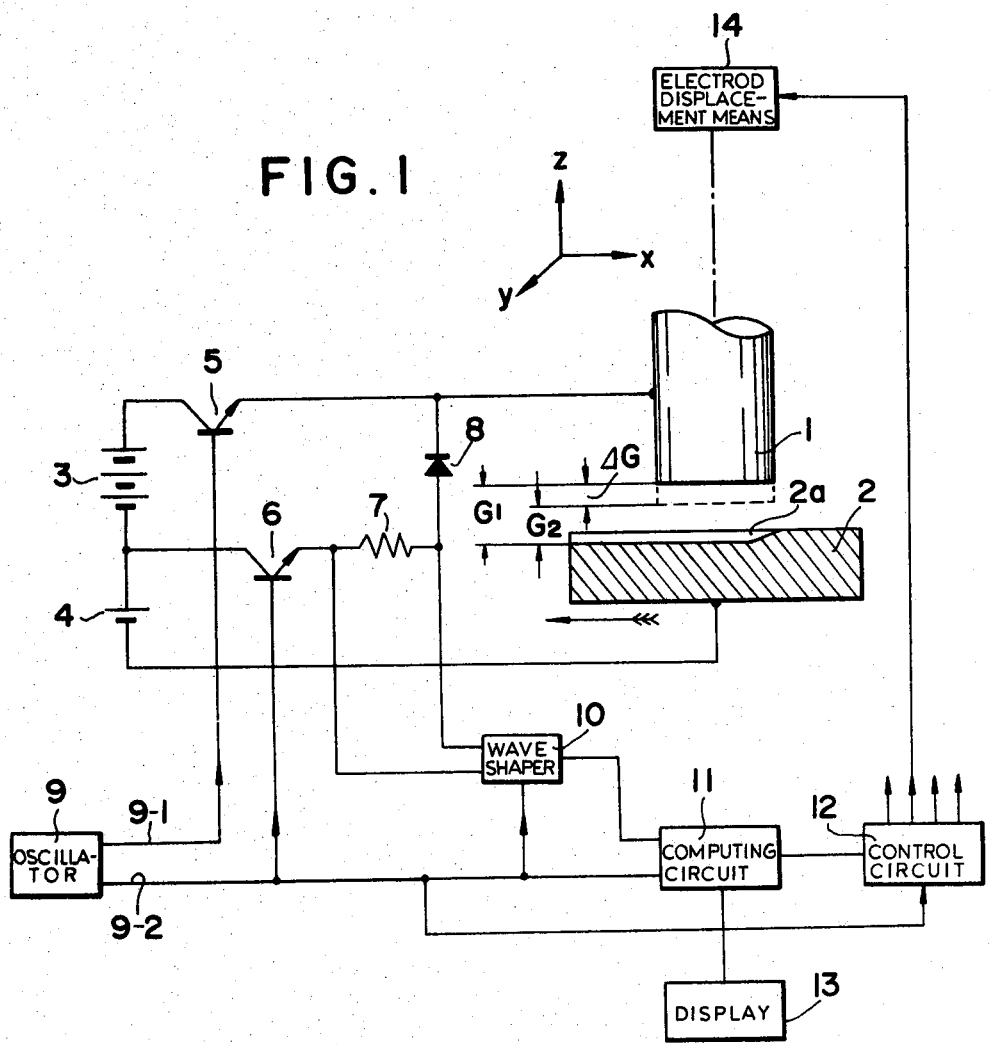
FIG. 1 is schematic diagram illustrating a tool electrode and a workpiece connected and positioned in an EDM arrangement including an embodiment of the invention.

Referring now to FIG. 1, a tool electrode 1 of a cylindrical form is shown juxtaposed with an electrically conductive workpiece 2. The tool electrode 1 and the workpiece 2 define between them a machining gap designated generally at G and shown in an enlarged size for the sake of explanation. The gap G is filled with a liquid dielectric such as kerosine or a deionized aqueous liquid supplied from a fluid passage (not shown) formed in the tool electrode 1 or from one or more nozzles disposed in the vicinity of the machining gap G.

Figure 3:
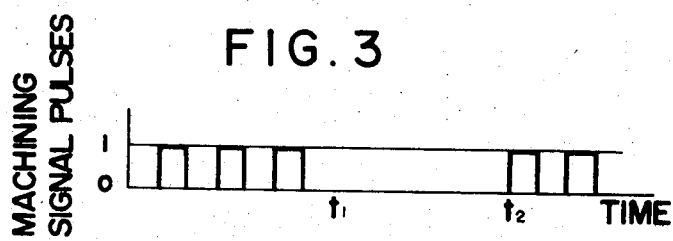
FIGS. 3 to 7 are waveform diagrams diagrammatically illustrating waveforme which are detected at various parts of the circuit of FIG. 1.
Figure 4:
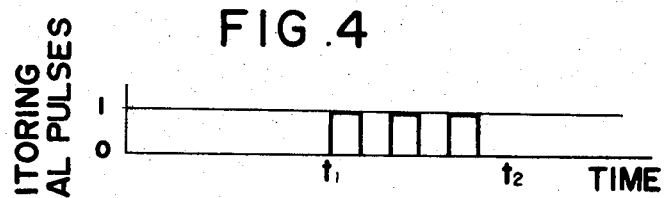

The tool electrode 1 and the workpiece 2 are energized by an EDM power supply here constituted by a first DC source 3 of high-voltage and high-current output and a second DC source 4 of a low-voltage and low-current output. These two sources are connected in series with one another and with the gap G via a power switch 5 to provide a machining voltage and current across the gap G. A second power switch 6, together with a resistor 7 and a diode 8, connects the second DC source 4 to the gap G to provide thereacross a monitoring voltage and current. An oscillator or signal pulse generator 9 has two output terminals 9-1 and 9-2 which are connected to control the on-off switching operation of the first and second switches 5 and 6, respectively. The oscillator 9 is adapted to provide alternately at its two output terminals 9-1 and 9-2 a succession of machining signal pulses and a succession of monitoring signal pulses, respectively as shown in FIGS. 3 and 4, respectively.

Figure 5:
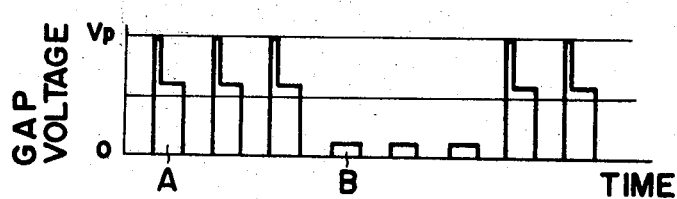
Figure 6:
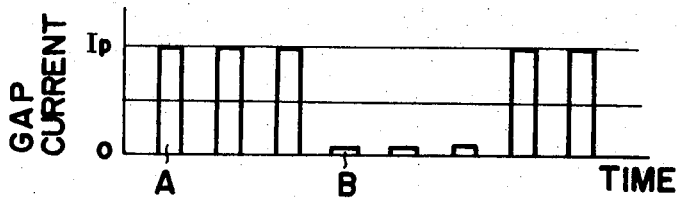

In one consecutive succession, the machining signal pulses occur in a fixed number, say, 1024 or $2^{10}$. The power switch 5 energized with the machining signal pulses is turned on and off alternately to pulse the summed output of the first and second DC sources 3 and 4. As a result, a succession of machining power pulses is furnished across the dielectric-filled gap G between the tool electrode 1 and the workpiece 2 to electroerosively remove material from the latter. The gap voltage and current waveforms of these machining power pulses, designated at A, are shown in FIGS. 5 and 6. As the electroerosive material removal proceeds, the workpiece 2 is displaced relative to the tool electrode 1 in a direction shown by the arrow or along an x-axis orthogonal to the axis of the tool electrode 1 to form a thin and uniform machined recess 2a on the workpiece 2.

The machining cycle is interrupted at time $t_1$ whereupon a monitoring period is set up and continues until time $t_2$. During the monitoring period $t_1-t_2$, the switch 6 energized with the monitoring signal pulses is turned on and off alternately to pulse the output of the second or monitoring DC source 4. As a result, a succession of monitoring pulses is furnished across the gap G between the tool electrode 1 and the workpiece 2. The gap voltage and current waveforms of these monitoring pulses are shown and designated at B in FIGS. 5 and 6. The monitoring voltage as shown is relatively low and only allows a weak leakage current to flow through the gap G.

Figure 2:
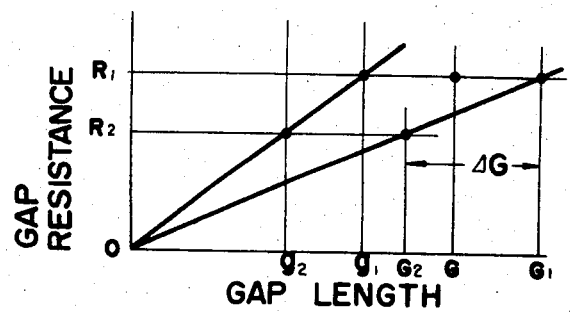
FIG. 2 is a graph representing relationships between the gap size and the electrical resistance which variably occur with the varying gap conditions.

It has been found that the use of one or more monitoring pulses alone or the measurement of the gap resistance with one or more monitoring pulses alone is not satisfactory or sufficient to determine either the actual gap spacing G or the gap specific resistivity as can be seen from the graph of FIG. 2. When the measurement shows a considerable high electric resistance $R_1$ it is not certain if the gap would have a relatively small size $g_1$ or a considerably larger size $G_1$ or any intermediate value G.

According to the present invention, the measurement of electrical resistance is made not only across the gap $G_1$ which will be found when the last of the consecutive machining (high-voltage) pulses terminates but also across the reduced gap with the tool electrode shifted away from the gap G, by a known distance $\Delta G$ during the monitoring period $t_1-t_2$, so that not only the gap size G but also the specific resistivity r of the liquid machining medium thereacross is determined to allow precise correction of the gap size, adjustment of the liquid machining medium and/or determination of the machining accuracy. The determined gap size may be used as a control signal whereby to regulate the rate of relative feed of the tool electrode to the workpiece and/or the parameters of the machining pulses.

Figure 7:
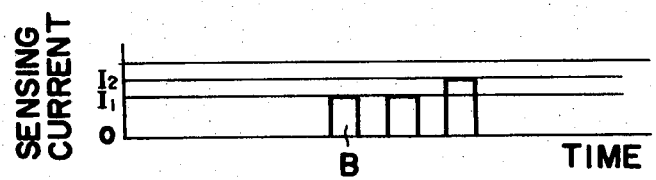

In FIG. 7, there are shown current pulses (monitoring) passing through the resistor 7 and amplified at a waveform-shaping circuit 10 (FIG. 1) connected thereacross. The output of the waveform-shaping circuit 10 is fed to a computing circuit 11, the output of which is in turn fed into a central control circuit 12. A numerical display 13 is also connected to the computing circuit 11.

The computing circuit 11 is designed to check the terminal voltages at the sensing resistor 7 which develop with several initial monitoring pulses and, when they are found to be stabilized, to issue a command pulse. The latter is transmitted via the central controller 12 to the electrode displacement means 14 whereby to advance the tool electrode 1 by a known distance $\Delta G$ and then to allow the resistance across the reduced gap $G_2 = G_1 - \Delta G$ to be measured by the computing circuit 10.

Assuming that electrical resistances at gap sizes $G_1$ and $G_2$ are $R_1$ and $R_2$ respectively, the following relations are given:

$$R_1 = \frac{r}{A} G_1 \qquad (1)$$

and $$R_2 = \frac{r}{A} G_2 \qquad (2)$$

where r is the specific resistivity of the liquid machining medium and A is the cross-sectional area of the tool electrode 1. Since $G_1 - G_2 = \Delta G$ is known, then the specific resistivity r is given by the equation:

$$r = \frac{R_1 - R_2}{G_1 - G_2} A = \frac{R_1 - R_2}{\Delta G} A \qquad (3)$$

And, the gap sizes $G_1$ and $G_2$ are given by the equations:

$$G_1 = \frac{R_1}{R_1 - R_2} \cdot \Delta G \qquad (4)$$

$$G_2 = \frac{R_2}{R_1 - R_2} \cdot \Delta G \qquad (5)$$

The computing circuit 11 conducts these calculations and may be of any design constructed and readily available in the art. The central controller 12 is adapted to respond to results of these calculations for providing a gap correction signal to the electrode feed means so that the correct gap size $G_o$ results, or a liquid correction signal to a liquid processing unit (not shown), e.g. an ion exchanger, so that the correct gap resistivity $r_o$ results. The central controller 12 may be of any design well known in the art and will not be described in greater detail here. The display unit 13 is coupled to the computing circuit 11 to numerically display the values measured therein and may be of any type well known in the art.

It can be seen that an extremely accurate determination of the machining gap condition is achieved. Not only the size of the machining gap but also the nature of the liquid machining medium can be controlled thereby. Hence, an EDM operation is permitted to be accomplished with greater purposefulness and efficacy.

Figure 8:
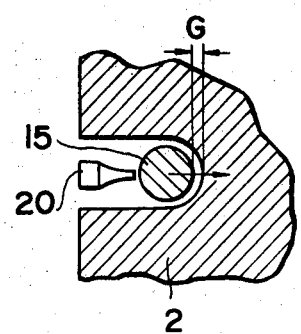
FIGS. 8 to 10 are schematic views diagrammatically illustrating various types of the EDM or other electroerosion machining processes.
Figure 9:
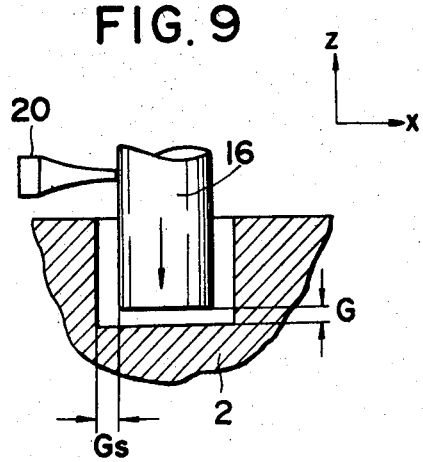
Figure 10:
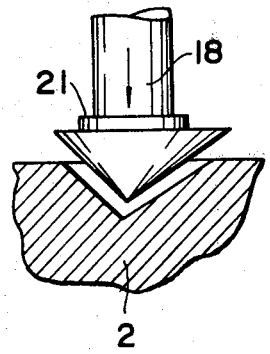

It will readily be appreciated that the invention is applicable to any form of EDM or other electrical machining operations using any form of the tool electrode. FIG. 8 shows a wire-cut EDM arrangement with a continuous wire electrode 15 for machining a workpiece 2 in which both the gap size and specific resistivity are ascertained in the manner described. FIG. 9 shows a sinking-type EDM arrangement using a cylindrical tool electrode 16 for machining a correspondingly shaped cavity in a workpiece 2. For determining a lateral gap size Gs, the tool electrode 1 may first be retracted in a vertical direction or along a Z-axis or to increase the frontal gap sufficiently so as to allow measurement of the electrical resistance across the lateral gap Gs which has resulted with the consecutive machining pulses A and then the tool electrode 1 displaced relative to the workpiece 2 by a known distance $\Delta$Gs in a horizontal or along the x axis. FIG. 10 shows a sinking-type EDM arrangement using a conical tool electrode 18 for machining a correspondingly shaped cavity in a workpiece 2. For determining gap size, the tool electrode 1 may be displaced in various directions to allow measurement across various gap regions.

Instead of displacing the tool electrode 1 by a known distance directly, mechanical vibrations with an amplitude equivalent to a known displacement $\Delta G$ may be applied to the tool electrode 1. Thus, a sonic or ultrasonic horn unit 20 may be disposed in contact with the tool electrode 1 as shown in FIGS. 8 and 9. Such a horn unit 20 or an electromechanical transducer 21 may be held on the three-dimensional tool electrode 18 as shown in FIG. 10. The known displacement distance may be 0.5 to 10 micrometer, preferably 1 to 2 micrometers.

There are thus provided an improved method and apparatus for determining relative position of a tool to a workpiece in a machine tool with due precision.

What is claimed is:

1. A method of determining relative position of a tool to a workpiece in a machine tool, comprising:
   (a) measuring the electrical resistance between said tool member and said workpiece in a given relative position to give a first measurement value;
   (b) relatively displacing said tool member and said workpiece by a known distance whereby to establish a shifted relative position between said tool member and said workpiece;
   (c) measuring the electrical resistance between said tool member and said workpiece in said shifted relative position to give a second measurement value; and
   (d) calculating at least one of said given and shifted relative positions between said tool member and said workpiece from said first and second measurement values and said known distance.

2. The method defined in claim 1 wherein the step (a) is carried out upon interrupting a given machining operation.

3. The method defined in claim 2 wherein the step (a) is carried out with said tool member and said workpiece in said given relative position after completing a given machining operation, the method further comprising determining the machining accuracy of said operation from said relative position determined.

4. The method defined in claim 3 wherein said machining accuracy is determined by calculating a deviation in distance from a predetermined correct relative position between said tool member and said workpiece.

5. The method defined in claim 2 wherein said machine tool is an electroerosion machine tool and the step (a) is carried out upon interrupting an electroerosion machining current to establish a monitoring period and wherein the steps (a), (b) and (c) are carried out during said monitoring period and with a monitoring electrical signal independent of said electroerosion machining current.

6. The method defined in claim 5 wherein said electroerosion machine tool is an EDM machine tool and wherein said electroerosion machining current is applied between said tool member and said workpiece in the form of a succession of machining pulses and said monitoring signal is applied between said tool member and said workpiece in the form of at least one monitoring pulse during said monitoring period.

7. The method defined in claim 1, further comprising the step of correcting relative position of said tool member to said workpiece by calculating a deviation in distance of said one of the given and shifted relative positions from a predetermined correct relative position between said tool member and said workpiece and relatively displacing said tool member and said workpiece from said one of given and shifted relative positions by said deviation in distance.

8. The method defined in claim 1, further comprising the step of determining the specific resistivity of a gap between said tool member and said workpiece by calculating it from said first and second measurement values and said known distance.

9. The method defined in claim 8 wherein said machine tool is an electroerosion machine tool and said specific resistivity is of an electroerosion gap formed between said tool member and said workpiece and filled with a liquid machining medium, the method further comprising controlling the supply of said liquid machining medium in response to said specific resistivity determined.

10. The method defined in claim 7, further comprising the step of determining the specific resistivity of a gap between said tool member and said workpiece by calculating it from said first and second measurement values and said known distance, wherein said deviation is obtained from said specific resistivity determined.

11. The method defined in claim 10, further comprising the steps of calculating a particular electrical resistance value corresponding to said predetermined correct relative position from said specific resistivity determined, wherein said tool member and said workpiece are relatively displaced until said electrical resistance therebetween becomes said particular value.

12. The method defined in claim 7, claim 10 or claim 11, further comprising the step of numerically displaying said deviation determined.

13. The method defined in claim 1 wherein said tool member and said workpiece are relatively displaced by said known distance by imparting mechanical vibrations to one of said tool member and said workpiece with an amplitude equivalent to said known distance and the step (c) is carried out by measuring the electrical resistance between said tool member and said workpiece one of which is vibrated.

14. A machine tool comprising in combination:
a tool member for machining a workpiece in a given machining operation;
means for interrupting said machining operation with said machine tool;
drive means for relatively displacing said tool member and said workpiece to hold them in a given relative position when said given machining operation is interrupted by said interrupting means and subsequently to place them in a relative position shifted by a known distance from said given relative position during a period of the said interruption of the machining operation,
sensing means for measuring the electrical resistance between said tool member and said workpiece in said given relative position and subsequently the electrical resistance between said tool member and workpiece in said shifted relative position to give a first and second measurement values, respectively; and
computing means for calculating at least one of said given and shifted relative positions from said first and second measurement values and said known distance.

15. The machine tool defined in claim 14 wherein said computing means is adapted to calculate a deviation in distance of said one of the given and shifted relative position from a predetermined correct relative position between said tool member and said workpiece.

16. The machine tool defined in claim 15, further comprising control means in response to said computing means for acting on said drive means to relatively displace said tool member and said workpiece by said deviation in distance.

17. The machine tool defined in claim 15, further comprising display means connected with said computing means for numerically displaying said deviation in distance.

18. The machine tool defined in claim 14, further comprising display means connected with said computing means for numerically displacing said one of the given and shifted relative positions.

19. The machine tool defined in claim 14 wherein said computing means is adapted to calculate the specific resistivity of a gap between said tool member and said workpiece from said first and second measurement values and said known distance.

20. The machine tool defined in claim 14 wherein said drive means includes vibrator means for imparting to one of said tool member and said workpiece mechanical vibrations with an amplitude equivalent to said known distance.

21. The machine tool defined in claim 14 wherein said known distance is a length between 0.5 and 10 micrometers.

22. The machine tool defined in claim 21 wherein said length is 1 to 2 micrometers.

* * * * *